Oct. 24, 1967 D. J. CRAWFORD 3,349,378

DATA SIGNAL SENSING SYSTEM

Filed May 14, 1965

INVENTOR
DAVID J. CRAWFORD

BY David M. Koffsky
ATTORNEY

United States Patent Office 3,349,378

Patented Oct. 24, 1967

3,349,378

DATA SIGNAL SENSING SYSTEM

David J. Crawford, Poughkeepsie, N.Y., assignor to International Business Machines Corporation, Armonk, N.Y., a corporation of New York Filed May 14, 1965, Ser. No. 455,883
4 Claims. (Cl. 340—172.5)

This invention relates to data storage systems and more particularly to an improved data signal sensing means for data storage systems.

In large data storage arrays, some data signals must travel a long distance—electrically speaking—before they arrive at the sense circuits. In such arrays, the transmission attenuation losses and distortions which affect data signals from relatively distant points cause deterioration in both the shape and amplitude of the signals. The resultant output signal levels present difficult design criteria for the sensing system (sense amplifiers and signal detectors). Each signal detector must be designed to have an acceptance threshold which is low enough to accept a worst case data signal arriving from the most distant point on the sense line; however, this results in the detector accepting noise along with a data signal from a point which is nearer on the sense line than the worst case. This noise may cause erroneous readouts from the array.

The aforementioned condition is a factor which determines how long a sense line can be, this is, how many bit positions can be served by one sensing system and acts to seriously limit the memory array capacity. It also acts to put unnecessarily tight specifications on the properties of the storage devices, memory noise levels and sensing system sensitivity levels.

Accordingly, it is an object of this invention to provide an improved data signal sensing system.

It is a further object of this invention to provide an improved data signal sensing system with a variable signal rejection threshold.

It is still another object of this invention to provide an improved data signal sensing system which reduces the amount of noise accepted by non-data pulse receiving sense circuits.

In accordance with the above stated objects a memory is provided with a plurality of addressable data word storage positions and means for reading out stored data signals, data signals so read out experiencing an attenuation proportional to the distance of the data word storage position from the memories sensing system. Additional means are provided to alter the ratio of the address predicted data signal level at the memories' sensing system to the sensing system's data signal acceptance threshold.

The foregoing and other objects, features and advantages of the invention will be apparent from the following more particular description of a preferred embodiment of the invention, as illustrated in the accompanying drawings.

Figure 1:
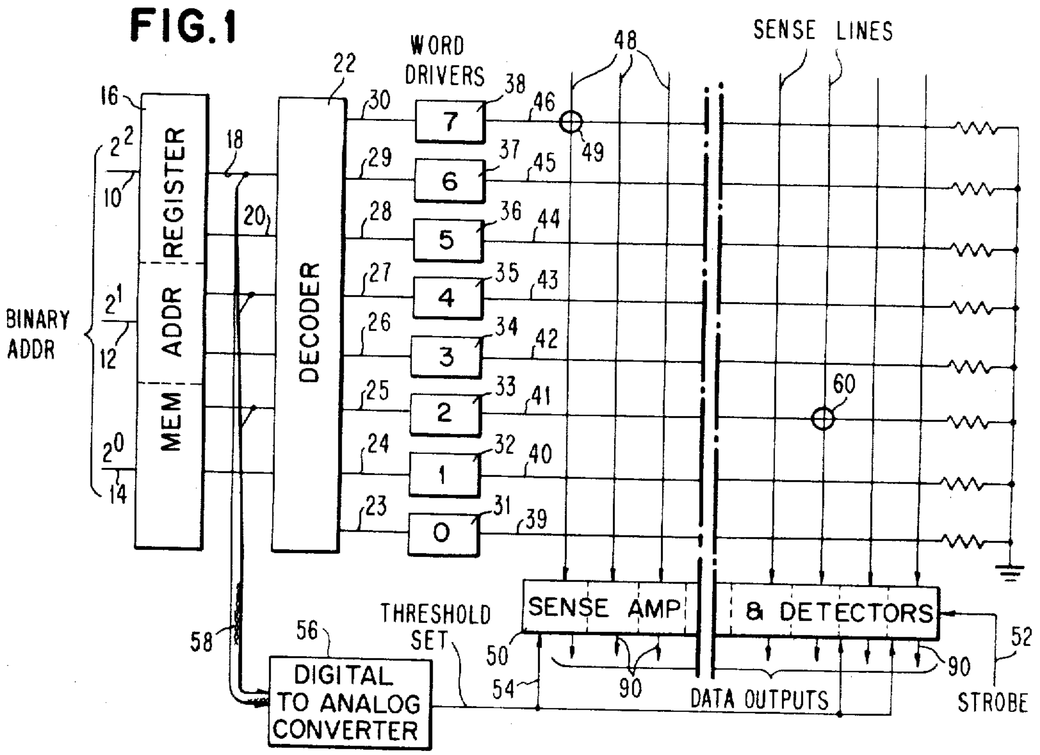
FIG. 1 is a block diagram of a data storage system which incorporates the invention.

Referring now to FIG. 1, a considerably simplified version of a two dimensional data storage array is illustrated. Input lines 10, 12 and 14 to memory address register 16 provide a discrete three bit binary address of a specifically desired group of bits stored in the storage array (hereinafter referred to as a word). In the simplified case under consideration, the three binary signals ($2^0$, $2^1$ and $2^2$) appearing on input line 10, 12 and 14 can designate the address of any of eight different storage words. Memory address register 16 comprises three storage positions which register and retain the binary level appearing on input lines 10, 12 and 14. Each position of memory address register 16 provides a true and complement output (18 and 20 respectively) to a decoding circuit 22. In response to the respectively energized or nonenergized states of the true and complement input lines, decoder 22 energizes one of its eight output lines 23–30. Each of output lines 23–30 is connected to a corresponding word driver 31–38 which is in turn directly coupled to a respective word drive line 39–46. Each of the word drive lines 39–46 is terminated in a resistive impedance to ground. Orthogonally oriented with respect to each of word drive lines 39–46 are a group of sense line 48. A binary storage device 49 is located at the intersection point of each of word drive lines 39–46 and sense lines 48, and is adapted to store and retain a bit of digital information. Each of sense lines 48 terminates in a corresponding sense amplifier and detector circuit 50. An enabling strobe input 52 renders sense amplifier and detector circuits 50 responsive to data signals appearing on sense lines 48. A further input to each of the sense amplifier and detector circuits 50 is provided via threshold set input 54 from digital to analog converter 56. Converter 56 receives its inputs via a three conductor cable 58 from the true ouput lines of memory address register 16.

As is well known, each of data storage elements 49 will respond to the energization of an associated word drive line by reading out its stored information as a data signal on the respectively associated sense line 48. The energization of an associated word drive line also causes a capacitively coupled noise signal to accompany the data signal. A data signal coming from a data storage element associated with word line 46 has a relatively long distance to travel before it gets to sense amplifier and detector circuits 50 and may thus be subject to significant attenuations and distortions. If, on the other hand, word drive line 41 is energized to cause memory element 60 to read out its information on its associated sense line 48, that data signal has a considerably lesser distance to travel before reaching sense amplifier detector circuits 50. As is obvious, the signal from data storage element 60 will be less attenuated than will be the signal from data storage element 49. If the data signal threshold acceptance level of each of the sense amplifier detector circuits 50 is set to sense the worst case data signal (e.g., from data storage element 49), the noise which is created when data signals are read out from more closely located data storage elements may be allowed to pass into the computing circuitry with the distinct possibility of creating erroneous data signal outputs.

To prevent the above from occurring, digital to analog converter circuit 56 is provided. Converter 56 responds to the energization of the true input lines of memory address register 16 by impressing a threshold potential on conductors 54 which sets the threshold of each of sense amplifier and detector circuits 50 at the optimum level to sense the read out data signals. This threshold level is determined by the relative proximity of the addressed data word to the sense amplifier and detector circuits 50. For instance, if binary address inputs 10, 12 and 14 are still at the 1 level, each of the true outputs of memory address register 16 will likewise be at the 1 level. Decoder 22 will respond thereto by energizing output line 30 to word driver 38 (indicating that the word driver corresponding to the binary address 111- or 7- has been addressed). In response, word drive line 46 will be energized and the associated data storage elements will be caused to read their stored information onto sense lines 48. The 1 levels on the true output lines of memory address register 16 will also feed via input cable 58 into digital to analog converter 56. Sensing that all 1's emanate from memory address register 16, the digital to analog converter circuit 56 determines that the addressed word line is the one which is at the greatest distance from sense amplifier and detector circuits 50. Accordingly, the threshold applied to output conductor 54 will be at its highest level to allow the lowest amplitude data signals to be accepted from sense lines 48. On the other hand, if a word line, e.g., such as 43, is addressed which is closer to the sense amplifier and detector circuit 50, digital to analog converter circuits 56 will set the detector circuit threshold at a lower level to prevent the noise from entering the computer circuitry while still allowing the data signal to be sensed.

Figure 2:
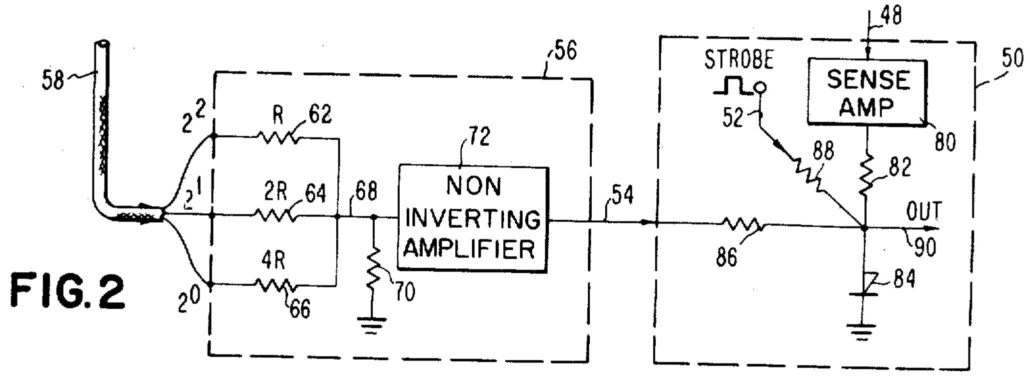
FIG. 2 is a circuit diagram illustrating a detailed embodiment of the invention.

Referring now to FIG. 2, a circuit diagram is shown which illustrates an embodiments of the invention. Each of the true outputs from the respective binary representing orders of memory address register 16 is applied via cable 58 to resistors 62, 64 and 66, respectively. More specifically, the $2^0$ is applied to resistor 66, the $2^1$ is applied to resistor 64 and the $2^2$ is applied to resistor 62. The output from each of resistors 62, 64 and 66 is applied via conductor 68 across resistor 70 which in turn provides the input potential for noninverting amplifier 72. The value of resistor 70 is made much less than any of resistors 62, 64 or 66 to assure that the currents supplied therefrom are substantially unaffected by voltage changes thereacross. The value of each of resistors 62, 64 and 66 is scaled so that the amount of current emanating therefrom is proportional to the binary value of the signal applied thereto. In other words, if the $2^2$ input is energized, resistor 62 with a value of R provides a unit of current into conductors 68 and resistor 70. If, on the other hand, the $2^1$ input is energized, one half of the current supplied by resistor 62 is supplied through resistor 64 (2R) to resistor 70. If the $2^0$ input is energized, only one quarter of the current that flows in resistor 62 will flow in resistor 66 (4R). As can thus be seen, the voltage developed across resistor 70 will be directly dependent upon which of the binary inputs to resistors 62, 64 and 66 is energized, and will induce a potential input to non-inverting amplifier 72 directly proportional to the digital value of the applied binary address. Noninverting amplifier 72 amplifies this potential to a suitable level and impresses it on output conductor 54 to the sense amplifier and detector circuits 50.

Each of sense lines 48 feeds into a sense amplifier 80 (only one is shown) which is a high gain amplifier adapted to produce an amplified replica of its input across output resistor 82. Serially connected between output resistor 82 and ground is a tunnel diode 84 which serves to detect the presence or absence of a data signal. The output of analog to digital converter 56 is applied across resistor 86 to the anode of tunnel diode 84 as also is a strobe input applied via conductor 52 and resistor 88. The data signal output is taken via conductor 90.

Figure 3:
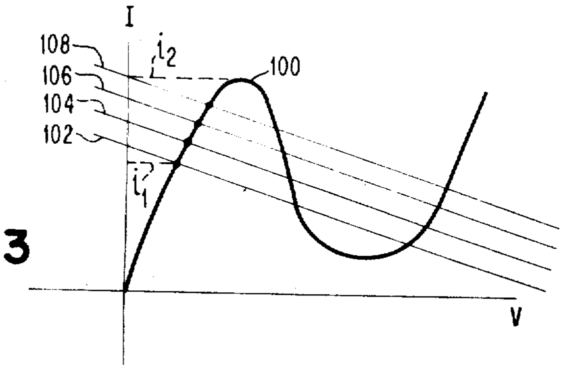
FIG. 3 is a characteristic curve of the threshold signal detection element of the invention which aids in understanding the operation of the circuit of FIG. 2.

In the absence of a strobe input on conductor 52, tunnel diode 84 is biased far down in its low voltage region and is insensitive to any output from sense amplifier 80. When, however, a strobe input is applied to conductor 52, a sufficient current is caused to flow through tunnel diode 84 to cause it to be biased into a bistable state. This can better be understood by referring now to FIG. 3.

Curve 100 is the well known V–I characteristic of a tunnel diode. The application of a strobe input across resistor 88 causes a current $i_1$ to flow through tunnel diode 84 which establishes load line 102 and creates a bistably biased condition. This condition establishes the sensitivity of tunnel diode 84 at its least sensitive point; that is, at the detection level where the largest data signal is expected. In other words, unless a data signal is received by sense amplifier 80 which is sufficient to cause an additional current $i_2$ to be supplied through resistor 82, tunnel diode 84 will not be triggered into its high voltage state. Under normal circumstances, tunnel diode 84 will only be biased to operate along load line 102 when it is to receive a data signal from a word located very near to sense amplifier 80. Load lines 104, 106 and 108 are representative of various of the eight possible load lines which may be established when the outputs from digital to analog converter 56 indicate that other than the closest data word is being addressed.

As aforestated, load line 102 is established when strobe input line 52 alone is energized. Under these circumstances, there is no voltage output from digital to analog converter 56 indicating that memory address register 16 is addressing word drive line 39 (binary address—000). If it is assumed that memory address register 16 has been commanded to address word drive line 46 (binary address 111) each of its true output lines will be energized to the 1 level thereby causing current to flow through each of the conductors in cable 58 and into resistors 62, 64 and 66. The sum total of these currents (1.75I) feeds into resistor 70 and causes a corresponding potential input to be applied to noninverting amplifier 72. A corresponding positive potential is applied via conductor 54 and resistor 86 to tunnel diode 84 and causes the establishment of load line 108. Under these conditions, only a small data signal current is required from sense amplifier 80 to cause the peak current of tunnel diode 84 to be exceeded with a resultant switching of tunnel diode 84 to its high voltage state.

As can thus be seen, the load line of tunnel diode 84 is varied in direct accordance with the expected attenuation which an addressed data signal will receive. While other specific examples of word lines being addressed will not be hereinafter discussed in detail, it should be readily apparent that the amount of current supplied through resistors 62, 64 and 66 will directly control the output of noninverting amplifier 72 and thereby control the relative position of the operating load line of tunnel diode 84. This in turn adjusts the sensitivity level of the detection circuit to prevent undesired noise signals from entering the computing circuitry.

The system shown in FIG. 1 is considerably simplified from one which would be found in actual practice. It may be found uneconomic to create a separate threshoud level for each and every separate word line. In a large array, very close to the ideal situation can be achieved by breaking the word addresses into groups which receive substantially similar attenuations and treating all words in a group alike so far as the detection threshold is concerned. This reduces the complexity of digital to analog converter 56 since it only has to deal with the more significant address digits of the word lines. A further refinement of the system can be made by realizing that when a specific word line is energized, that the word drive pulse is also attenuated as it travels along the word drive line. For this reason, somewhat attenuated data signals may be induced onto sense lines 48 which lie at a substantial distance from the word drivers. This attenuation can easily be taken into account in the sensing circuitry by slightly reducing the value of resistor 88 as the sense lines become farther removed from their respective word drivers. In this manner, the sensitivity of the associated tunnel diode detectors is increased to take into account the aforesaid attenuation. A further modification of the invention can be accomplished by applying the address related variable level controls to the memory driving system (instead of the sensing system) and holding the signal acceptance threshold of the sensing system constant. This technique also achieves the desired result of balancing address related data signal levels to the sensing system signal acceptance levels.

For ease of explanation, it has been assumed that the threshold level for each address would be a linear function of the address position as determined by the current inputs to the digital to analog converter. It may however occur, that the attenuation of the data signal from a paricular address approximates a nonlinear function (such as exponential). In such cases, the digital to analog converter can be designed to provide the necessary nonlinear level setting relationship to approximately match the array characteristics. It should further be understood that the showing of FIG. 1 of a two dimensional magnetic core array is only for explanatory purposes and this invention is directly applicable to any memory array, whether it be two dimensional or three dimensional and whether it be magnetic, utilize active circuits (e.g., tunnel diode) or otherwise.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a memory the combination comprising:
- a plurality of data word storage positions, each said storage position having a discrete address designation;
- means for reading out the data signals stored in any data word storage position onto a plurality of sense lines, each said sense lines having the property of attenuating a data signal in accordance with the length of each said signal's travel along said line;
- means coupled to said sense lines for detecting said read-out data signals; and
- means for altering the ratio of the address predicted signal level at said detecting means with the signal acceptance threshold of said detecting means.

2. In a data storage array which upon receipt of a set of address signals on a set of address lines acts to provide a corresponding set of data signals, the combination comprising:
- a plurality of data storage means, arranged to store words of data;
- drive means for inserting into and extracting from said data storage elements said data words;
- means for sensing said extracted data words;
- detector means connected to each said sense means, each said detector means having an adjustable data signal detection threshold; and
- means connected between said address lines and each said detector means for adjusting the threshold of said detector means in accordance with the address designated by said set of address signals.

3. In a data storage array which responds to the receipt of a set of address signals on a set of address lines to provide a corresponding set of data signals, the combination comprising:
- a plurality of data storage elements;
- a plurality of drive lines, each said drive line having an address designation;
- a plurality of sense lines, each said sense line arranged to intersect a drive line at a data storage element;
- data signal sense means connected to each said sense line, each said data signal sense means having an adjustable data signal detection threshold; and
- means connected between said address lines and each said data signal sense means for adjusting the threshold of said sense means in accordance with the address designated by said set of address signals.

4. In a data storage array which responds to the receipt of a set of address signals on a set of address lines to provide a corresponding set of data signals, the combination comprising:
- a plurality of data storage elements;
- a plurality of drive lines, each said drive line having a discrete address designation;
- a plurality of sense lines, each said sense line arranged to intersect a drive line at a data storage element;
- data signal sense means connected to each said sense line, each said data signal sense means having an adjustable data signal detection threshold; and
- threshold address means connected between said address lines and each said data signal sense means for raising or lowering the sensitivity of said sense means in accordance with the nearness to said sense means of the address designated by said set of address signals.

References Cited

UNITED STATES PATENTS 3,296,595 1/1967 James ------------ 340—172.5

ROBERT C. BAILEY, *Primary Examiner.*

R. ZACHE, *Assistant Examiner.*